Figure 2:
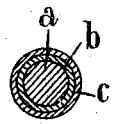

June 26, 1928.

U. MEYER 1,674,912

CONDUCTOR LOADED WITH WOUND ON CONDUCTORS

Filed Feb. 3, 1925

U. Meyer
inventor

By: Marks & Clerk
Attys

Patented June 26, 1928.

1,674,912

UNITED STATES PATENT OFFICE.

ULFILAS MEYER, OF BERLIN-LICHTERFELDE, GERMANY.

CONDUCTOR LOADED WITH WOUND-ON CONDUCTORS.

Application filed February 3, 1925, Serial No. 6,660, and in Germany February 16, 1924.

It has first been made known by Krarup that the self-inductance of conductors can be conveniently increased by winding a wire or strip of magnetic material around them. In order to be able to follow by calculation the action of the magnetic layer on the self-inductance and on the increase in resistance, it has hitherto been assumed (see for instance Larsen, Elektrotechnische Zeitschrift 1908, page 1030) that after going once around the conductor, all the magnetic lines of force are closed. A thorough investigation of the magnetic field, however, shows that its structure is much more complicated and more particularly that a component of the magnetic induction due to the helical formation of the magnetic cover is present in the direction of the axis of the conductor. This component induces a current in a circuit surrounding the conductor, also the plane of the circuit lies at right angles to the axis of the conductor, so that if an alternating current flows through the conductor on which the wire has been wound, the covering thus formed is also traversed by alternating current. These theoretical considerations, which have been fully confirmed by experiment, are of great importance as regards the practical utilization of conductors loaded with wound on conductors. In the first instance, the component of the magnetic induction in the longitudinal direction of the conductor may increase the cross-talk effect in the adjacent conductors to an undesirable extent. Secondly, an additional increase in resistance may arise owing to this component, if layers of conducting material surround the conductor, which layers act in the same way as the short-circuited windings of a transformer. This condition is almost always present in the case of single-core cables; the sea water, a sheath serving as a mechanical protection and the brass strip placed around gutta-percha cables for protecting them against teredine form layers that act in the manner above referred to.

The detrimental magnetic component runs in the one or the opposite direction, according as to whether the wound on conductor represents a right-hand or a left-hand screw. In order to avoid the drawbacks above referred to, according to the present invention the conductor is loaded with two or more conductors wound thereon in opposite directions, the individual layers being so dimensioned that the total of the magnetic induction extending over all the layers is entirely or substantially nil in the longitudinal direction of the conductor. For mechanical and other reasons it has previously been proposed to use several layers of wound on conductors, but these conductors were generally made of equal dimensions. However, the permeability of the magnetic material in the high grade wound on conductors is greatly dependent upon the heat treatment to which the conductor is subjected after it has been loaded with the wound on conductors. Owing to the rate of cooling being different for the individual layers, they will have a different permeability and consequently the induction in the longitudinal direction will be different. Therefore such an arrangement would not ensure the object of the invention being attained. The magnitude of the induction in the longitudinal direction of the conductor depends not only upon the permeability, but also upon the thickness of the wound on layer, the width of the strip or wire and the width of the air gap. It is necessary that all these values should be made relatively to one another such that the total of the induction in the longitudinal direction of the conductor shall be nil, which result can be attained by trial or calculation.

Figure 1:
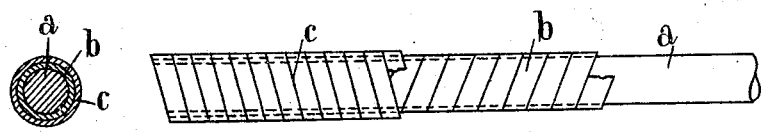

The accompanying drawing illustrates by way of example a uniformly loaded conductor according to the present invention Figure 1 being a longitudinal view and Figure 2 a cross-section thereof. The copper conductor $a$ is loaded with two tapes of magnetizable material $b$ and $c$ which are wound thereon in opposite directions, the width, thickness and angle of pitch of the tape being different from the width, thickness and angle of pitch of the other tape, and such that the total of the magnetic induction in the longitudinal direction of the conductor is as small as possible.

The measurement of the induction in the longitudinal direction of the conductor is effected by sliding a coil over the conductor loaded with the wound on conductors so that its axis shall coincide with the axis of the conductor. The E. M. F. induced in the coil will then be proportional to the induction in the longitudinal direction of the conductor and may be measured by means of a ballistic galvanometer when use is made of continuous current or by means of a compensating method when use is made of alternating current. In this way it is possible by testing various samples of conductors loaded with different wound on conductors to ascertain the most favourable form of construction.

Theoretical investigation of the magnetic field shows that the value of the induction in the longitudinal direction is approximately proportional to $$\frac{b.\mu.\delta.n}{\sqrt{1+(2\pi.r.n)^2}}$$

wherein $b$ is the width, $\delta$ the thickness and $\mu$ the permeability of the magnetic strip, $n$ the number of windings per unit of length and $r$ the mean radius of the winding. If the induction flux is to go circularly around the conductor, it cannot pass solely through a turn but it must at least at one point pass also through the air and the subsequent turn, since the turns are not circular but helically wound around the conductor. It is assumed in the calculation that the magnetic resistance of the air path is large as compared with that of the magnetic material. The latter condition is fulfilled with sufficient accuracy in all the cases that may occur in practice. The individual values have to be chosen such that they approximately satisfy the equation $$\Sigma \frac{b.\mu.\delta.n}{\sqrt{1+(2\pi.r.n)^2}}=0$$

wherein the sum covers all the layers and the members wound on in one direction have opposite signs to those wound on in the other direction.

What I claim is:—

1. A conductor loaded with a plurality of oppositely wound magnetic layers, the thickness, width, number of windings per unit length and permeability of which are relatively proportioned to each other to effect substantially a zero longitudinal magnetic induction of said conductor.

2. An electrical conductor having a plurality of oppositely wound layers, so dimensioned and of such a permeability as to effect a substantially zero longitudinal component of magnetic induction of said conductor.

In testimony whereof I have signed my name to this specification.

Dr. ULFILAS MEYER.